(12) United States Patent
Donaldson et al.

(10) Patent No.: US 9,478,934 B1
(45) Date of Patent: Oct. 25, 2016

(54) EXCIMER GAS PURIFICATION

(71) Applicant: LightMachinery Inc., Nepean (CA)

(72) Inventors: Adam Donaldson, Bedford (CA); Edward S. Williams, Kanata (CA); John H. Hunter, Almonte (CA); Tekai Akuetteh, Ottawa (CA); Ian J. Miller, Ottawa (CA)

(73) Assignee: LightMachinery Inc., Nepean (CA)

( * ) Notice: Subject to any disclaimer, the term of this patent is extended or adjusted under 35 U.S.C. 154(b) by 0 days.

(21) Appl. No.: 14/868,535

(22) Filed: Sep. 29, 2015

Related U.S. Application Data

(60) Provisional application No. 62/196,382, filed on Jul. 24, 2015.

(51) Int. Cl.
*H01S 3/13* (2006.01)
*H01S 3/225* (2006.01)

(52) U.S. Cl.
CPC ............ *H01S 3/1303* (2013.01); *H01S 3/225* (2013.01)

(58) Field of Classification Search
CPC .... H01S 3/1303; H01S 3/225; H01S 3/0943; H01S 3/095
See application file for complete search history.

(56) References Cited

U.S. PATENT DOCUMENTS

| | | | |
|---|---|---|---|
| 2,426,557 A | 8/1947 | Long et al. | ................... 428/402 |
| 3,821,660 A * | 6/1974 | Shang | ....................... H01S 3/09 359/345 |
| 4,940,505 A * | 7/1990 | Schachameyer | .. H01L 21/02046 117/103 |
| 8,929,419 B1 | 1/2015 | Dean et al. | ..................... 372/57 |

* cited by examiner

*Primary Examiner* — Dung Nguyen
(74) *Attorney, Agent, or Firm* — Teitelbaum & MacLean; Neil Teitelbaum; Doug MacLean

(57) ABSTRACT

The disclosure relates to the removal of hydrogen fluoride (HF) from an excimer laser either in operation or in standby using a metal halide salt reactor. Removal of HF is desirable because the contaminant not only absorbs laser emission, thus reducing laser power, but it is also chemically reactive, and degrades the lifetime of internal laser components. The metal halide salt reactor may be provided either in the laser vessel or in an external conduit loop.

20 Claims, 4 Drawing Sheets

EXCIMER GAS PURIFICATION

CROSS-REFERENCE TO RELATED APPLICATIONS

The present invention claims priority from U.S. Patent Application No. 62/196,382, filed Jun. 24, 2015, which is incorporated herein by reference.

TECHNICAL FIELD

The present invention relates to the purification of excimer laser gases, and in particular to the removal of hydrogen fluoride from excimer laser gases.

BACKGROUND OF THE INVENTION

Excimer lasers are pulsed, gas-discharge lasers, and operate on a gas mixture containing rare gasses, for example: some combination of helium, neon, argon, krypton and xenon gases; and a halogen gas, for example fluorine, hydrogen chloride, etc. Under the appropriate conditions of electrical stimulation and high pressure, a pseudo-molecule called an excimer, or in the case of noble gas halides an exciplex, is created, which can only exist in an energized state and may give rise to laser light in the ultraviolet (UV) range.

There are four most commonly used excimer wavelengths, which are dependent upon the active gases in the laser, i.e. Argon Fluoride (193 nm), Krypton Fluoride (248 nm), Xenon Chloride (308 nm), and Xenon Fluoride (351 nm). The invention could also be used with a fluorine laser (157 nm), although this is not actually an excimer.

In excimer lasers containing fluorine, the generation of hydrogen fluoride (HF) is a significant detriment to laser performance because HF is a strong absorber of UV light produced by the excimer laser, and because HF is much more chemically reactive than fluorine gas. The increased reactivity of HF accelerates wear on components within the laser vessel, and therefore may shorten the service life thereof.

HF forms when fluorine reacts with water and other hydrogen containing compounds. Typically small amounts of water vapor are introduced into the excimer laser when a fresh gas fill is added through contamination of the laser gases with water vapor, or when the laser vessel is opened for service. Simply evacuating the vessel may be effective in removing most laser gas contaminants, e.g. carbon tetrafluoride ($CF_4$), which don't have a storage reservoir within the laser vessel, but HF is extraordinarily reactive and polar, and tends to stick to the interior surface of the laser vessel and any dust inside the laser. Accordingly, while most contaminants are diluted by the ratio of the operating pressure to the evacuation pressure each time a fresh fill of gas is added, HF is much less diluted.

For a typical operating pressure of 5 bar, and an evacuation pressure of 0.1 bar, contaminants are diluted by a factor of 50. If the contaminants, other than HF, have a concentration of 250 ppmv when the gas fill is replaced, then the fresh fill will start with only 5 ppmv of these contaminants. For HF, the dilution method does not work as well, because the HF is in equilibrium with the interior of the laser vessel at a pressure of a few millibar. For example, a residual pressure of 1 millibar is equivalent to 200 ppmv concentration in a 5 bar laser gas mix. Evacuating the laser vessel to a pressure below the equilibrium pressure of the HF is not practical for industrial use. When a fresh fill is added to the laser vessel, and the laser warms up, the absorbed HF partially desorbs and contaminates the fresh gas fill.

Existing methods for gas purification in an excimer laser include cryogenic trapping of contaminants, such as HF and $CF_4$, and purification of gasses being introduced into the laser vessel. Moreover, care may be taken with material choices inside the laser vessel to minimize reactions with the halogen components of the gas mix.

U.S. Pat. No. 8,929,419, issued Jan. 6, 2015 in the name of Dean et al, which is incorporated herein by reference, describes removal of contaminants and fluorine to allow recycling of the noble gas component of the excimer laser gas mixture.

An object of the present invention is to overcome the shortcomings of the prior art by reducing the concentration of HF within an excimer laser.

SUMMARY OF THE INVENTION

Accordingly, the present invention relates to an excimer laser system comprising:

a laser vessel for generating light from laser gases comprising a noble gas and fluorine gas, wherein a portion of the fluorine gas reacts with hydrogen in the laser vessel to form hydrogen fluoride (HF) resulting in contaminated laser gases;

an optical output port for outputting the light; and a reactor comprising a source of a metal halide salt, capable of absorbing HF, for absorbing HF from the contaminated laser gases forming filtered laser gases.

Another aspect of the present invention relates to a method of operating an excimer laser comprising:

a) generating light in a laser chamber from laser gases comprising a noble gas and a fluorine gas, whereby a portion of the fluorine gas forms hydrogen fluoride (HF) resulting in contaminated laser gas; and b) passing the contaminated laser gas over a reactor including a supply of a metal halide salt capable of absorbing HF for absorbing HF from the contaminated laser gases forming filtered laser gases.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
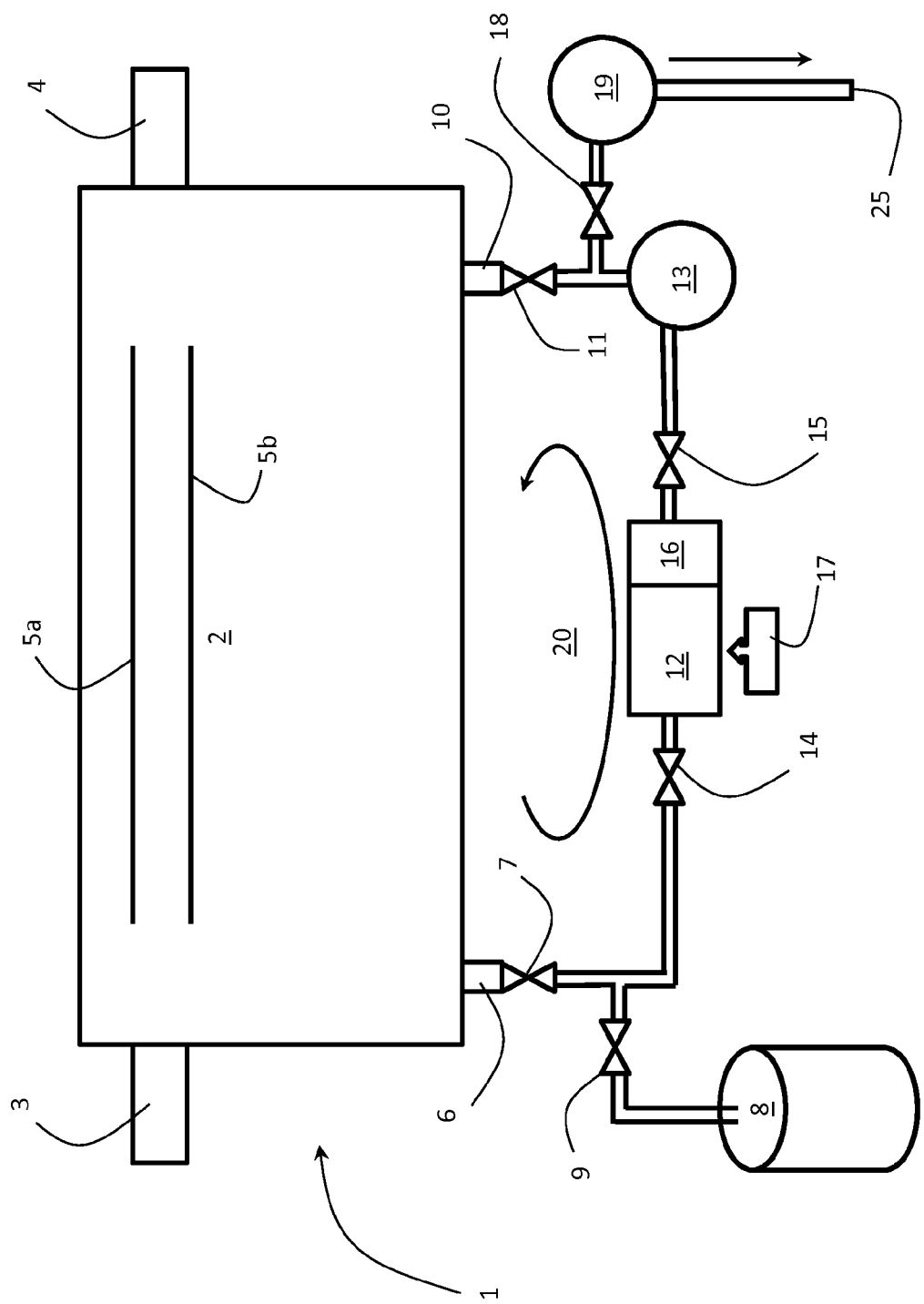
FIG. 1 is a schematic diagram of a laser device of the present invention.
Figure 2:
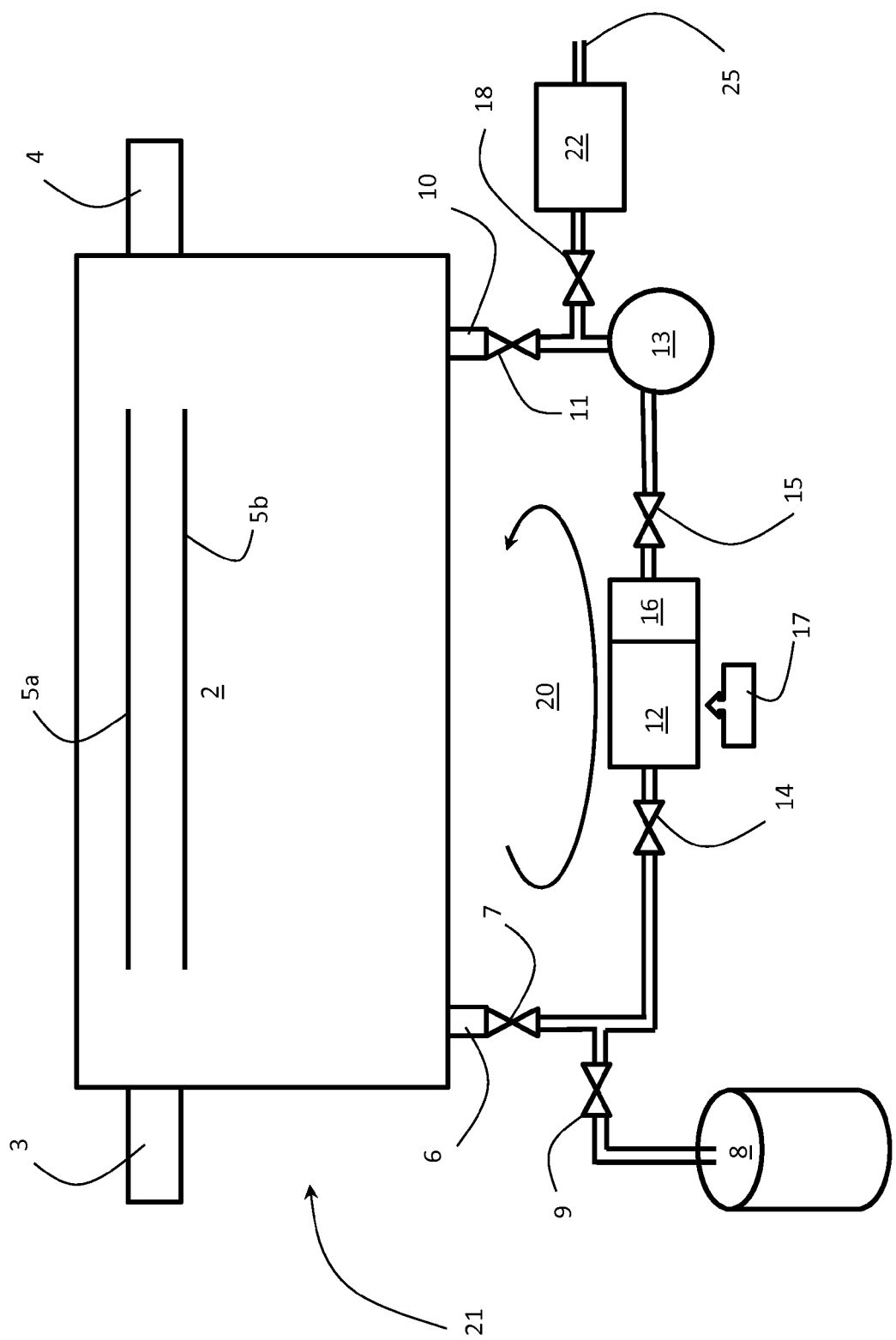
FIG. 2 is a schematic diagram of another embodiment of a laser device in accordance with the present invention.

While the present teachings are described in conjunction with various embodiments and examples, it is not intended that the present teachings be limited to such embodiments. On the contrary, the present teachings encompass various alternatives and equivalents, as will be appreciated by those of skill in the art.

With reference to FIGS. 1 to 4, an excimer laser device 1, 21, 31 and 41 includes a laser vessel or chamber 2 with a front optic port 3 for launching light generated therein, a rear optic port 4 for mounting a rear mirror, and the required electrical stimulating structures, as is well known in the prior art, such as parallel electrodes 5a and 5b extending along a length of opposite sides of the laser vessel 2. A first gas input/output port 6, including first input/output valve 7, enables laser gases, comprised of a noble gas, e.g. Argon, Krypton, Xenon and Neon, and a halogen gas, e.g. hydrogen chloride or fluorine, along with any buffer gases, e.g. Neon and Helium, to be input from a supply port 8, e.g. one or more storage tanks, via supply valve 9 and other suitable pipes, conduits and fittings.

Over time the laser gases are depleted and become contaminated, as hereinbefore discussed. In the embodiments illustrated in FIGS. 1 and 2, the contaminated laser gas is pumped from the laser vessel 2, via the first input/output port 6 and the first input/output valve 7 with the supply valve 9 closed, through a reactor vessel 12 including a suitable metal halide salt capable of absorbing hydrogen fluoride, preferably a metal fluoride salt, preferably an alkali metal fluoride or an alkaline earth fluoride, and in a preferred embodiment sodium fluoride (NaF). The metal fluoride salt may be held at a temperature where the equilibrium vapor pressure of HF over the salt is low, at least when the metal fluoride has a low loading with HF, e.g. at initial startup, since the equilibrium vapour pressure will gradually increase as more HF is absorbed; for example ideally less than 5 Pa, so that the equilibrium HF concentration in the laser gas is less than 10 ppmv.

A pump 13 circulates the contaminated laser gas through an external conduit loop 20 including the reactor vessel 12, filled with pellets of the metal fluoride salt, and reactor input and output valves 14 and 15, on either side of the reactor vessel 12, before returning the purified gas to the main laser vessel 2, via a return port 10 and a second input/output valve 11. The external conduit loop 20 also includes suitable conduits, e.g. pipes or hoses, unions and fittings, for connecting the other elements, e.g. the laser vessel 2, the valves 7, 11, 14 and 15, and the reactor vessel 12. The pump 13 may be a diaphragm pump, or other appropriate pump. The amount of metal fluoride salt is selected to match the expected quantity of HF, which might normally be produced within the laser 1 between major laser service intervals.

A dust filtration system 16 may be added to the external conduit loop 20, e.g. adjacent the reactor vessel 12, to remove dust particles from the laser gas stream providing a further benefit to the laser system 1. To evacuate the laser vessel 2 of all laser gases, the reactor output valve 15 is closed and an exhaust valve 18 is opened enabling an exhaust pump/scrubber 19 to draw the laser gases out of the laser vessel 2 via the second input/output port 10 and the second input/output valve 11 for exhausting via an exhaust port 25.

Metal fluoride salts may absorb HF, but when fully fluorinated, may not react with fluorine. However, most of the absorption of HF in the reactor vessel 12 is a surface phenomenon, and could also be described as adsorption. For the laser system 1, it is not important whether the removal of HF by the metal fluoride is by adsorption or absorption or a combination of the two processes. Throughout this description "absorption" should be understood to mean any combination of adsorption, chemisorption and absorption onto the metal fluoride, which results in entrapment of HF.

By closing the first and second input/output valves 7 and 11 between the laser vessel 2 and the external conduit loop 20 it is possible to either regenerate the metal fluoride salt, or to replace the reactor vessel 12 with a fresh one when the metal fluoride salt is saturated with HF either during operation of the laser 1 or during a shutdown period. During regeneration, the laser 1 may continue to be operated or may be shut down, and the metal fluoride salt may be regenerated by heating the metal fluoride salt with a heater 17 to above a regeneration temperature, e.g. above 100° C., preferably between 200° C. and 300° C., and in a preferred embodiment between 210° C. and 250° C., and evacuating the reactor vessel 12 under vacuum and/or by passing an inert, dry gas, e.g. Helium, over the metal fluoride salt bed. Regeneration may take place at other temperatures below 100° C. or above 300° C. depending on the specific materials in question and the amount of HF captured. In the illustrated embodiment, the inert, dry gas may be supplied from a source, e.g. connected to the supply valve 9, which is connected to the external conduit loop 20. The inert, dry gas then travels through the reactor vessel 12 to the exhaust valve 18 for exhausting out of the external conduit loop 20 via the exhaust port 25. In the case of absorber replacement, closure of the input and output valves 14 and 15 on the reactor vessel 12 prevent contamination of the laser vessel 2 and the reactor vessel 12 with atmospheric moisture, oxygen, etc, while the metal fluoride salt and/or the reactor vessel 12 are replaced.

Regeneration may be required because the absorption capacity of the metal fluoride is limited by a combination of the chemistry and surface area of the metal fluoride within the reactor vessel 12. As the quantity of HF absorbed in the reactor vessel 12 increases, the absorption rate for additional HF will decrease, and the equilibrium vapor pressure of HF above the reactor vessel 12 will increase. Eventually, the performance of the laser 1, 21, 31, 41 will start to degrade because the reactor vessel 12 is no longer able to substantially control the level of HF within the laser 1, 21, 31 and 41, and at that point the reactor vessel 12 should be regenerated or replaced.

The temperature of the reactor vessel 12 may be varied using the heater 17 to change the absorption rate, or for regeneration. Operation of the reactor vessel 12 near room temperature, e.g. 15° to 35° or preferably 20° to 25° C., is preferred because the equilibrium vapor pressure of HF over the metal fluoride salt, e.g. metal fluoride, bed is low in this temperature range. Operation of the reactor vessel 12 at higher temperatures progressively raises the equilibrium HF pressure, and thus increases the concentration of HF inside the laser 1.

By selection of an appropriate vacuum pump 13, e.g. a diaphragm pump, it is possible to eliminate one of the pumps, e.g. pump 19. In an excimer laser device 21, illustrated in FIG. 2, circulation of the laser gas through the reactor vessel 12 maintains a low level of HF with the laser vessel 2. Closing the second input/output valve 11 and the supply valve 9 to the laser vessel 2 and opening the exhaust valve 18 to a scrubber 22 enables evacuation of the laser vessel 2 using the pump 13 via the first input/output port 6, the first input/output valve 7 and the reactor vessel 12. The laser vessel 2 may be refilled with fresh gas via the first input/output port 6 and the first input/output valve 7 by closing the reactor input valve 14 and opening the supply valve 9, and connecting the supply port 8 with suitable laser gas supply tanks. Like reference numerals in this embodiment denote similar elements with similar function to those of the previous embodiment.

Figure 3:
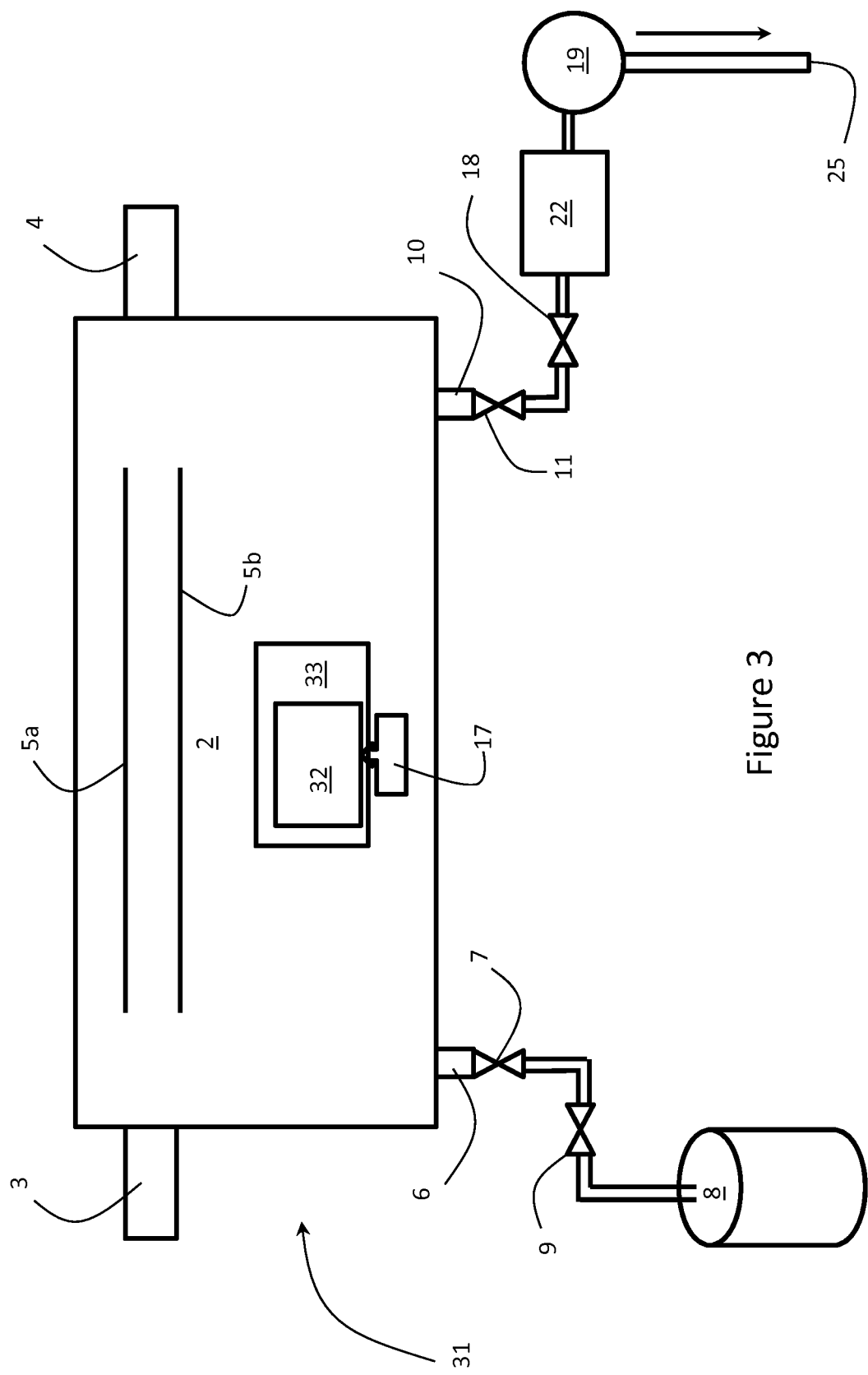
FIG. 3 is a schematic diagram of another embodiment of the laser device in accordance with the present invention.

In another embodiment of the system, illustrated in FIG. 3, in an excimer laser device 31 the metal fluoride salt is passively exposed to the laser gas by placing a reactor vessel 32 including a metal fluoride salt, as hereinbefore discussed, inside the laser vessel 2. This arrangement is simpler as it does not require a separate pump, extra valves or valve controls or external conduit loop 20. In this embodiment, the reactor vessel 32 is loaded into the laser vessel 2 at the time of the initial assembly. If the reactor vessel 32 is placed inside the laser vessel 2, it may be contained within a filter basket 33, e.g. comprised of stainless steel or other compatible material, to prevent dust contamination of the laser optics with particles of the metal fluoride salt, and to enable gas circulation around the absorbing metal fluoride salt material. The normal circulation of gas within an excimer vessel 2, required for stable operation of the electrical discharge of the laser 31, is sufficient to ensure an adequate rate of HF absorption in the reactor vessel 32.

To enable regeneration of the reactor vessel 32 within the laser vessel 2, the laser 31 may also be equipped with a heater 17. During regeneration, the laser 31 is shut off, and the heater 17 heats the reactor vessel 32 to over a regeneration temperature as hereinbefore defined, e.g. over 200° C., between 200° C. and 300° C., and in a preferred embodiment to about 230° C., which may be sufficient to regenerate the metal fluoride salt in the reactor vessel 32.

In this embodiment of the excimer laser 31, there is no independent pump circulating laser gas through the reactor vessel 32. The laser gases may be admitted into the laser vessel 2 as hereinbefore described via any combination of the first input/output port 6, the first input/output valve 7, the supply valve 9, the supply port 8, and any suitable combination of storage tanks. Furthermore, the laser gases may be evacuated from the laser vessel 2 as hereinbefore described via any combination of the second input/output port 10, the second input/output valve 11, the exhaust valve 18, the scrubber 22, and the exhaust port 25. Like reference numerals in this embodiment denote similar elements with similar function to those of the previous embodiments.

Figure 4:
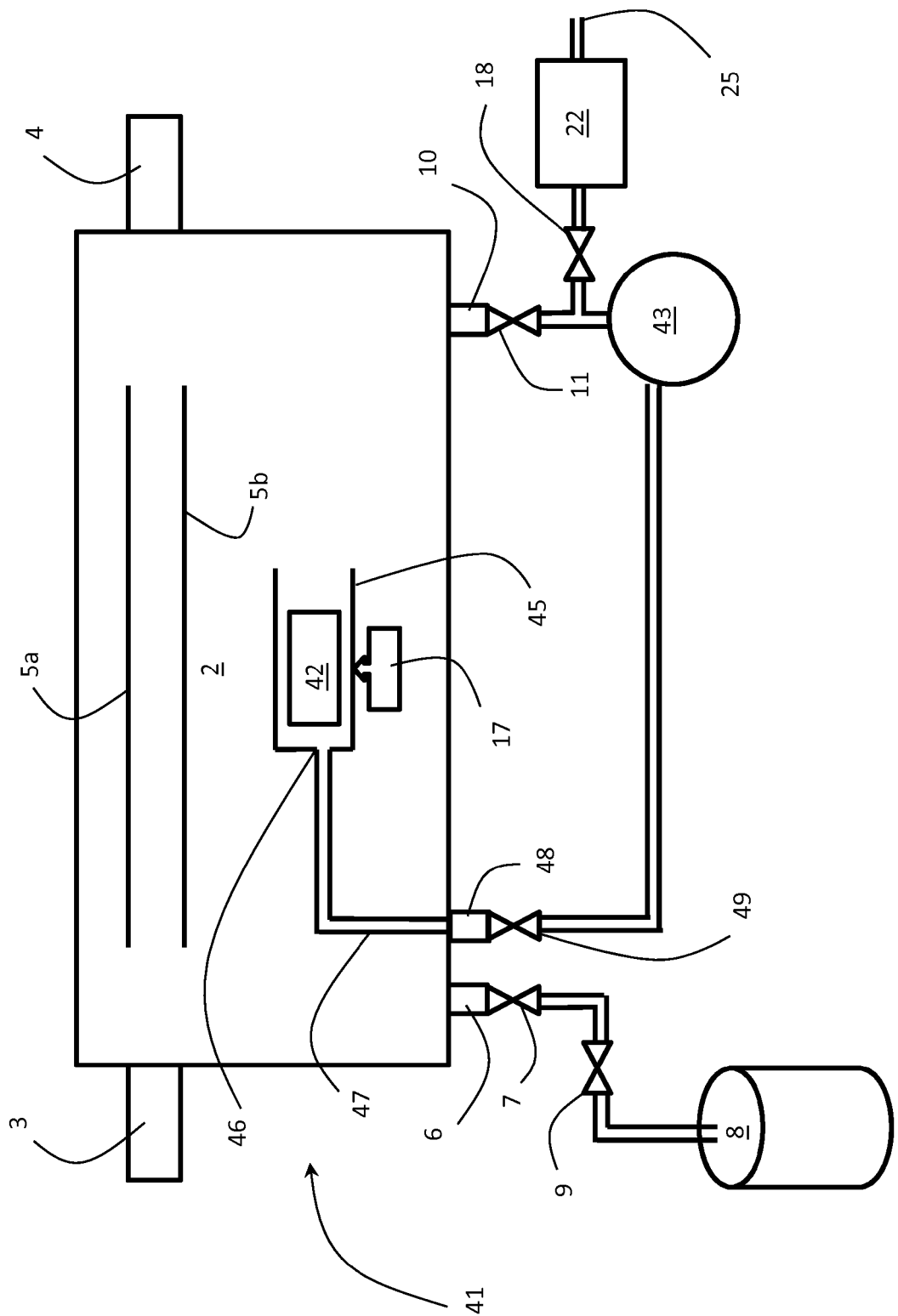
FIG. 4 is a schematic diagram of another embodiment of the laser device in accordance with the present invention.

FIG. 4 illustrates another embodiment of an excimer laser device 41 with an internal metal fluoride salt reactor vessel 42 configuration including a metal fluoride salt, as hereinbefore described. In this embodiment, the reactor vessel 42 is mounted within and at least partially surrounded by a shroud 45, which is open on one end and includes a circulation port 46 at another, e.g. opposite, end thereof. The circulation port 46 may be connected to a circulation pipe or conduit 47, which in turn may be connected to an output port 48 in the laser vessel 2 or may be directly connected to the output port 48. A circulation valve 49, provided at the output port 48, enables the output port 48 to be opened and closed.

An external pump 43 draws the contaminated laser gas through the shroud 45 and over the reactor vessel 42. Then the filtered laser gas is drawn out the circulation port 46, the circulation pipe 47 (if necessary), the output port 48, and the opened circulation valve 49 to the pump 43, which returns the filtered gas into the laser vessel 2 via the opened second input/output valve 11, the second input/output port 10, and other suitable pipes and fittings. The first input/output port 6 and the first input/output valve 7 remain closed during normal operation, but may be used to provide laser gases, as hereinbefore described.

The external pump 43 and the shroud 45 are particularly advantageous during regeneration of the internal reactor vessel 42 because it prevents the desorbed HF from being reabsorbed elsewhere within the laser vessel 2.

For regeneration of the reactor vessel 42, the laser 41 is shut down, the metal fluoride salt is heated to a regeneration temperature, e.g. over 200° C., preferably between 200° C. and 300° C., and in a preferred embodiment approximately 230° C. or above, by the heater 17. In this configuration, the actual regeneration temperature may be significantly lower than the ideal because of the proximity to other laser components, which may not tolerate such elevated temperatures. In which case, the actual regeneration temperature may be lowered to approximately 150° C. or whatever temperature does not adversely affect other laser components. The second input/output valve 11 is closed, and the exhaust valve 18 is opened to enable the desorbed HF to be pumped out of the laser vessel 2 via any combination of the circulation port 46, the circulation pipe 47 (if necessary), the output port 48, the circulation valve 49, the pump 43, the exhaust valve 18, the scrubber 22, the exhaust port 25, and other suitable pipes and fittings. The supply valve 9 and the first input/output valve 7 may be opened during regeneration to enable a flow of inert gas, for example helium, into the laser vessel 2 and through the reactor 42, and out the exhaust valve 18 with the desorbed HF. In this variant, regeneration of the reactor vessel 42 implies replacing the laser gas, as well, because it is necessary to pump the desorbed HF out of the laser vessel 2.

Additional purifiers in the same external conduit loop 20 or in independent loops, such as disclosed in U.S. Pat. No. 8,929,419, may be added to any of the aforementioned embodiments to enhance purification of the laser gases. Like reference numerals in this embodiment denote similar elements with similar function to those of the previous embodiments.

Among the factors which influence the selection of the metal fluoride salt, are the following: water absorption/adsorption, HF absorption capacity, mechanical stability of the XF/HF compound, cost.

Sodium fluoride, for example, reacts with HF:

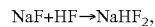

to form sodium bifluoride. Higher order reactions are also possible:

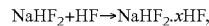

where x can be as many as 4.

One balancing factor which must be considered when sizing the reactor vessels 12, 32 or 42 with the correct amount of metal fluoride salt is that at very high absorption levels, when x is substantially higher than 1, the NaF mechanical structure degrades. As a result, the reactor vessels 12, 32 or 42 may contaminate the laser 1, 21, 31 or 41 rather than purifying the laser gas, so oversizing the reactor vessels 12, 32 or 42 is desirable to avoid this condition.

A metal fluoride which is strongly hydrated is also undesirable since:

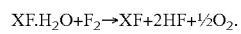

A practical metal fluoride for the reactor vessels 12, 32 or 42 may be available or readily prepared in a substantially non-hydrated form.

The level of HF contamination that is typically present in an excimer laser 1, 21, 31 or 41 is less than 500 ppmv. For a typical excimer gas volume of 100 l at 5 bar, this level of contamination represents 11 mmol of HF, which could be fully absorbed with the first stage reaction by only 0.47 g of NaF, if it had sufficient surface area. An absorption reactor designed to eliminate the HF from 100 laser fills would only need to contain 47 g or more of NaF.

A preferred embodiment includes approximately at least 100 g of NaF, which experimentally provides at least 165 mmoles of HF absorption capacity. This value is only about 7% of the theoretical amount, and is thought to be limited by the available surface area of the metal fluoride. Very fine particles of metal fluoride are not desirable because they may be hard to contain, leading to contamination of the laser vessel. The preferred form of the metal fluoride is as pellets (typically 1-10 mm in diameter, preferably about 3 mm) with a porous structure to provide greater surface area for absorption of HF. Typical pellets of NaF do not have sufficient porosity to absorb the theoretical amount of HF. Typical laser operation is likely to result in the generation of 70 mmoles of HF over the life the laser vessel 2. Actual HF generation may be higher depending on contamination with water or other hydrogen containing molecules introduced with the laser gas, through laser maintenance or from materials within the laser vessel 2. The pressure of HF over a bed of NaF is observed to be <5 Pa at 25° C. When the laser vessel 2 is replaced or refurbished, the reactor vessel 12, 32 or 42 may be replaced or regenerated by heating, e.g. to over 100° C., preferably between approximately 200° C. and 300° C., and in a preferred embodiment to between 220° C. and 250° C., to drive off the absorbed HF. Heating the metal fluoride to lower temperatures, e.g. less than 100° C., may drive off a smaller fraction of absorbed HF, which although not fully regenerating HF absorption capacity of the reactor, would still provide some HF absorption capacity.

Heating the reactor vessel 12, 32 or 42 to reduced temperatures is not fully effective in removing the HF. Other work shows that higher temperatures, e.g. 300° C. to 500° C., will drive off more HF, more rapidly, but these elevated temperatures complicate the design, e.g. power requirements, of the reactor vessel 12, 32 or 42.

A smaller amount of metal fluoride salt, for example about 10 g of NaF, may also be used with reduced overall HF absorption capacity, and slower HF removal rate. For excimer lasers with a small laser vessel, e.g. 10 liters or less, this reduced amount of NaF may be appropriate. For laser vessels 2, e.g. larger than 100 liters, or if the input laser gas is more highly contaminated, a larger amount of metal fluoride salt, e.g. NaF, may also be used.

The flow of laser gas through the reactor vessel 12, 32 or 42 may be 5 to 10 standard liters per minute. Lower flow rates may have trouble maintaining a practically low level of HF within the laser chamber, and higher flow rates may consume excess energy, although the reactor vessel 12, 32 or 42 may still function as intended. Note that for a significantly larger laser, or one with a higher HF generation rate, a higher flow may be required in order to maintain the lowest possible levels of HF within the laser.

The selection of the reactor volume, i.e. the amount of metal fluoride salt, and the flow rate through the reactor vessel 12, 32 or 42 may be chosen so that the potential rate of absorption of HF is substantially higher than the rate of production of HF within the laser 1, 21, 31 or 41. But, for a practically sized reactor vessel 12, 32 or 42, the concentration of HF leaving the reactor vessel may not be at the ultimate low level when the input gas is highly contaminated, e.g. if a significant quantity of moisture, e.g. 100 ppmv, is inadvertently introduced into the laser, until the entire volume of the laser gas has been circulated several times through the reactor vessel 12, 32 or 42. The absorption of HF by the metal fluoride salt in a single pass at a level of approximately 50% has been found to be sufficient for efficient operation of the reactor vessel 12, 32 or 42. Relatively larger amounts of metal fluoride salt will reduce the HF level more rapidly, but the ultimate level will be unaffected until the reactor vessel 12, 32 or 42 is saturated. Similarly, a smaller amount of metal fluoride salt will still reduce the level of HF within the laser 1, 21, 32 or 41, although at a slower rate. Eventually, if the amount of metal fluoride salt is too small for the laser 1, 21, 31 or 41, HF levels within the laser will not drop to the ultimate level determined by the vapor pressure above the metal fluoride salt.

Before operation of the reactor vessel 12, 32 or 42, it may be necessary to heat the metal fluoride salt to the regeneration temperature to drive off any absorbed water or HF. Alternately, sodium bifluoride (NaHF$_2$) may be used as a source of NaF in the reactor vessel 12, 32 or 42, in which case the functional performance of the metal fluoride salt is greatly improved if the sodium bifluoride is first heated to drive off the absorbed HF. Moreover, driving off the HF results in the metal fluoride salt having a more porous microstructure with better absorption properties.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An excimer laser system comprising:
    a laser vessel for generating light from laser gases comprising a noble gas and fluorine gas, wherein a portion of the fluorine gas reacts with hydrogen in the laser vessel to form hydrogen fluoride (HF) resulting in contaminated laser gases;
    an optical output port for outputting the light; and
    a reactor comprising a source of a metal halide salt, capable of absorbing HF, for absorbing HF from the contaminated laser gases forming filtered laser gases.

2. The system according to claim 1, wherein the reactor is mounted in the laser vessel.

3. The system according to claim 2, further comprising a filter basket for containing the metal fluoride salt to prevent contamination of the optical output port with particles of the metal fluoride salt.

4. The system according to claim 2, further comprising:
    a shroud at least partially enclosing the reactor including an open end for receiving the contaminated laser gases, and a shroud output port for outputting the filtered laser gases;
    a gas output port coupled to the shroud output port for outputting the filtered laser gases from the laser vessel; and
    a gas input port for returning the filtered laser gases to the laser vessel.

5. The system according to claim 2, further comprising a heater for heating the reactor to above a regeneration temperature for regenerating the metal fluoride salt and driving off absorbed HF.

6. The system according to claim 5, further comprising:
    a supply port for inputting an inert gas into the laser vessel; and
    an exhaust port for outputting the inert gas and HF driven off of the metal fluoride salt.

7. The system according to claim 1, further comprising:
    a gas output port for outputting the contaminated laser gases from the laser vessel;
    a gas input port for returning the filtered laser gases to the laser vessel;
    a pump for drawing the contaminated laser gases from the output port through a conduit loop, and pumping the filtered laser gases back through the gas input port;

wherein the reactor is disposed in the conduit loop between the gas output port and the gas input port.

8. The system according to claim 7, further comprising a filter for removing dust particles from the laser gases in the conduit loop.

9. The system according to claim 7, further comprising a heater for heating the reactor to above a regeneration temperature for regenerating the metal fluoride salt and releasing absorbed HF.

10. The system according to claim 9, further comprising:
first and second input/output valves for closing the gas input and output ports, respectively; and
a supply port enabling a supply of an inert gas to be passed over the reactor; and
an exhaust port for exhausting the HF released from the metal fluoride salt.

11. The system according to claim 1, wherein the metal halide salt comprises a metal fluoride salt.

12. The system according to claim 11, wherein the metal fluoride salt comprises sodium fluoride.

13. The system according to claim 11, wherein the source of the metal fluoride salt comprises sodium bifluoride.

14. A method of operating an excimer laser comprising:
a) generating light in a laser chamber from laser gases comprising a noble gas and a fluorine gas, whereby a portion of the fluorine gas forms hydrogen fluoride (HF) resulting in contaminated laser gas; and
b) passing the contaminated laser gas over a reactor including a supply of a metal halide salt capable of absorbing HF for absorbing HF from the contaminated laser gases forming filtered laser gases.

15. The method according to claim 14, wherein step b) comprises:
enclosing the reactor in a shroud including an open end for receiving the contaminated laser gases, and a shroud output port for outputting the filtered laser gases;
outputting the filtered laser gases from the laser vessel via the shroud output port; and
returning the filtered laser gases to the laser vessel.

16. The method according to claim 15, further comprising heating the reactor to above a regeneration temperature for regenerating the metal halide salt, and release absorbed HF from the metal halide salt.

17. The method according to claim 16, further comprising:
inputting an inert gas into the laser vessel; and
outputting the inert gas and HF driven off of the metal halide salt via the shroud output port to an exhaust port.

18. The method according to claim 14, further comprising:
outputting the contaminated laser gases from the laser vessel via an output port;
drawing the contaminated laser gases from the output port through a conduit loop including the reactor; and
returning the filtered laser gases to the laser vessel via an input port.

19. The method according to claim 18, further comprising:
isolating the conduit loop from the reactor;
heating the reactor to above a regeneration temperature to release HF from the metal fluoride salt;
passing an inert gas over the metal halide salt to remove the HF from the reactor; and
outputting the inert gas and HF, released from the metal halide salt, via an exhaust port.

20. The method according to claim 14, wherein the metal halide salt comprises a metal fluoride salt.

* * * * *